United States Patent
Whaley

(10) Patent No.: US 9,163,697 B2
(45) Date of Patent: *Oct. 20, 2015

(54) MULTI-PURPOSE ADJUSTABLE RETAINING DEVICE

(71) Applicant: Bed Band Store, LLC, Dublin, TX (US)

(72) Inventor: Jamie D. Whaley, Dublin, TX (US)

(73) Assignee: Bed Band Store, LLC, Dublin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/569,223

(22) Filed: Dec. 12, 2014

(65) Prior Publication Data

US 2015/0096123 A1 Apr. 9, 2015

Related U.S. Application Data

(63) Continuation of application No. 14/298,026, filed on Jun. 14, 2014, which is a continuation-in-part of application No. 13/176,806, filed on Jul. 6, 2011, now abandoned.

(60) Provisional application No. 61/399,175, filed on Jul. 8, 2010.

(51) Int. Cl.
| | |
|---|---|
| *F16B 5/06* | (2006.01) |
| *F16G 11/04* | (2006.01) |
| *A47C 21/02* | (2006.01) |
| *A44B 11/06* | (2006.01) |
| *F16B 2/18* | (2006.01) |
| *F16B 2/08* | (2006.01) |

(52) U.S. Cl.
CPC .............. *F16G 11/048* (2013.01); *A44B 11/06* (2013.01); *A47C 21/022* (2013.01); *A47C 21/026* (2013.01); *F16B 2/185* (2013.01); *F16B 2/08* (2013.01); *Y10T 24/23* (2015.01); *Y10T 24/316* (2015.01)

(58) Field of Classification Search
CPC ....... F16G 11/03; F16G 11/101; F16G 11/10; Y10T 24/3984; Y10T 24/314; Y10T 24/316; Y10T 24/23; A43C 7/00; A43C 21/022
USPC ............... 24/115 G, 122.6, 712.1, 712.5, 504
See application file for complete search history.

(56) References Cited

U.S. PATENT DOCUMENTS

| | | | |
|---|---|---|---|
| 481,425 A | 8/1892 | Robinson | |
| 875,006 A | 12/1907 | Smith | |
| 1,061,809 A * | 5/1913 | Bocorselski et al. | H01R 4/4872 24/115 G |
| 1,204,457 A * | 11/1916 | Kreeft .................. | H01R 4/4872 24/115 G |
| 4,328,605 A * | 5/1982 | Hutchison ............... | F16G 11/10 24/115 G |
| 4,662,016 A | 5/1987 | Seeman | |
| 4,991,593 A * | 2/1991 | LeVahn .................... | A01N 1/02 128/853 |
| 5,144,695 A | 9/1992 | Schweizer | |
| 5,351,367 A | 10/1994 | Kennedy et al. | |

(Continued)

*Primary Examiner* — Robert J Sandy
*Assistant Examiner* — Michael Lee
(74) *Attorney, Agent, or Firm* — Scott T. Griggs; Griggs Bergen LLP

(57) ABSTRACT

A multi-purpose adjustable retaining device is disclosed. In one embodiment, a cord having two ends is provided that is composed of an elastomeric material configured to deform elastically upon elongation. Each of ends of the cord are threaded through a cord stop, which permits the length of each end to be adjusted, with any spare cord forming a loop extending from a side of the cord stop opposite the two ends. Suspension clips are respectively slidably connected to each end of the cord in order to grip a material.

7 Claims, 3 Drawing Sheets

(56) References Cited

U.S. PATENT DOCUMENTS

| | | | |
|---|---|---|---|
| 5,459,903 A | 10/1995 | Treacy | |
| 5,611,118 A | 3/1997 | Bibbee | |
| 5,632,069 A * | 5/1997 | Mievis | 24/337 |
| 5,657,557 A | 8/1997 | Hull et al. | |
| 6,442,762 B1 | 9/2002 | Neumann | |
| 7,020,935 B2 | 4/2006 | Behn et al. | |
| 7,174,607 B1 * | 2/2007 | Buettell | A45F 5/00 24/499 |
| D539,697 S | 4/2007 | Mackay | |
| 2006/0211336 A1 | 9/2006 | Brigham | |
| 2010/0325842 A1 | 12/2010 | Rivera | |
| 2012/0005867 A1 | 1/2012 | Whaley | |
| 2013/0104346 A1 * | 5/2013 | Kawaguchi | 24/115 G |
| 2014/0283301 A1 | 9/2014 | Whaley | |

* cited by examiner

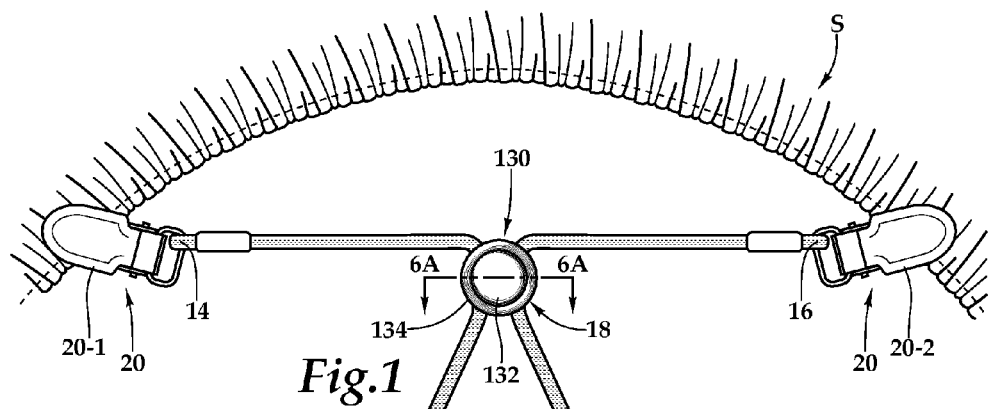
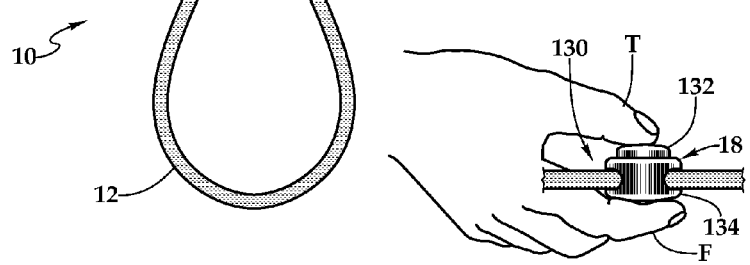
*Fig.2B*
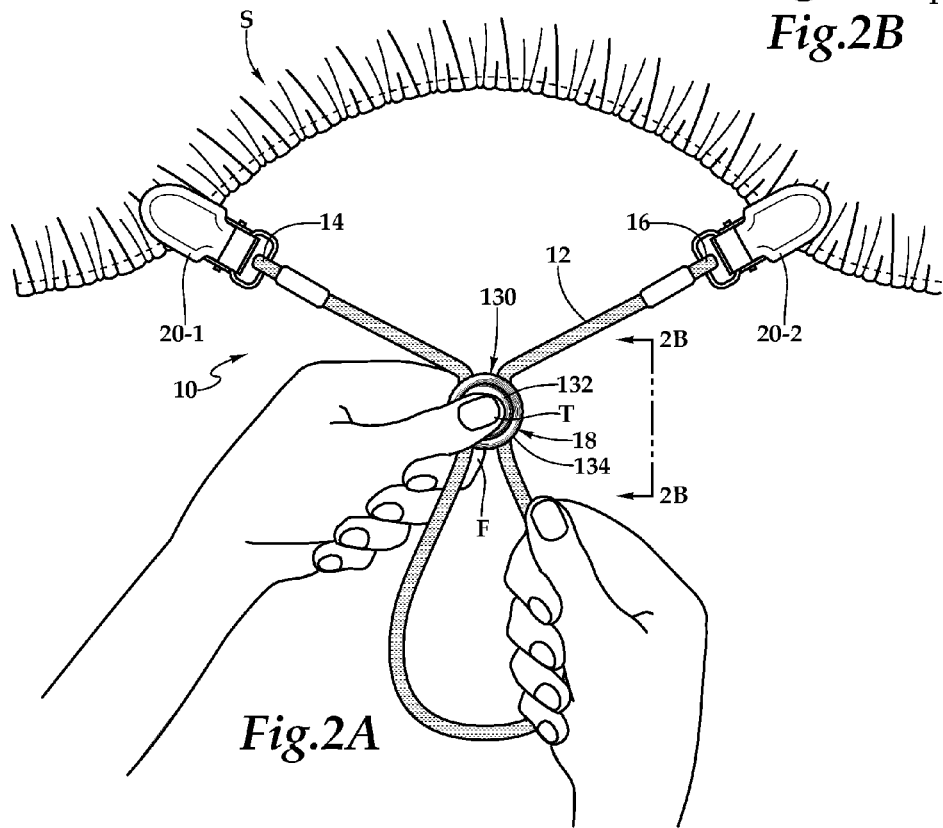
*Fig.2A*

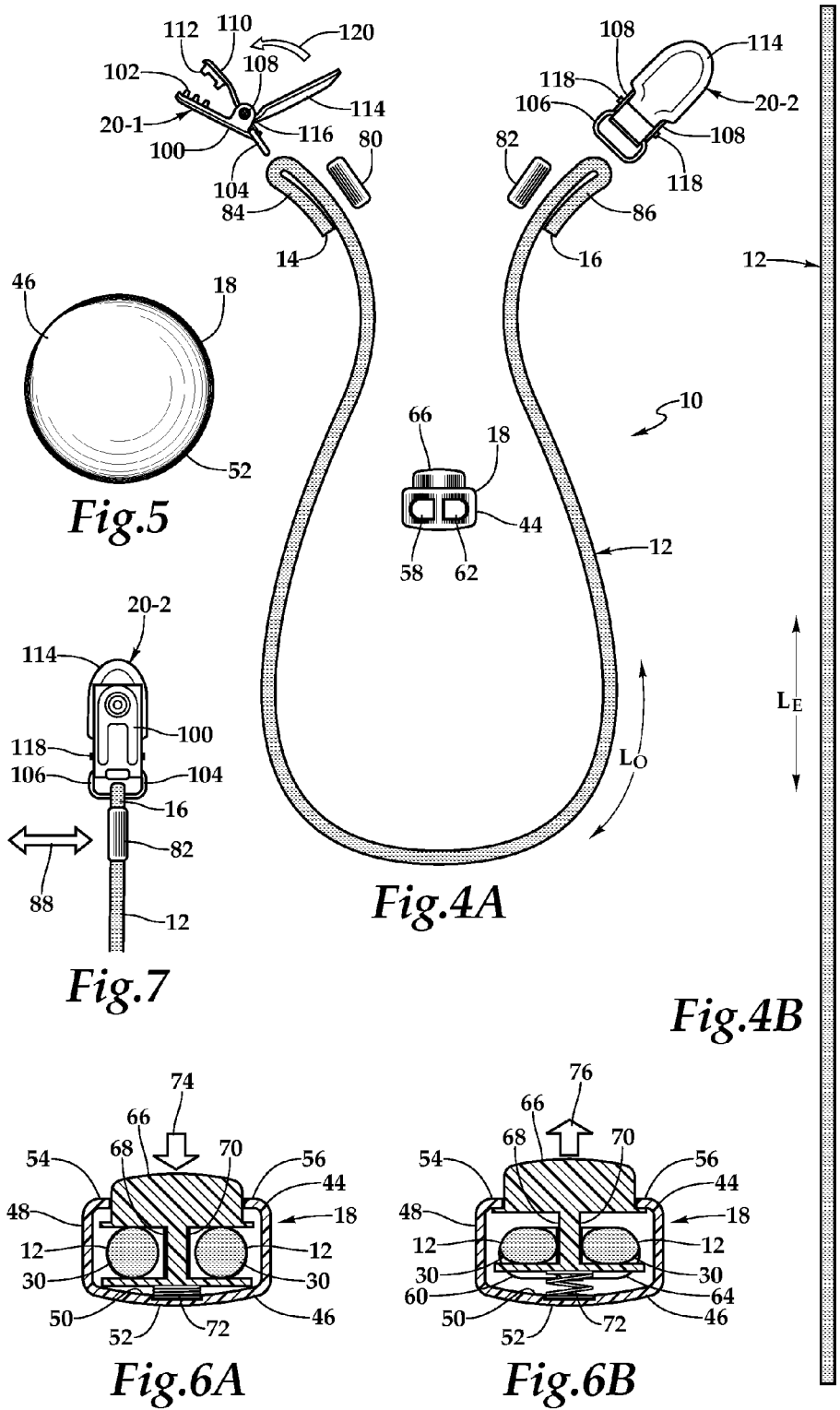

MULTI-PURPOSE ADJUSTABLE RETAINING DEVICE

CROSS-REFERENCE TO RELATED APPLICATIONS

This application is a continuation of co-pending U.S. patent application Ser. No. 14/298,026, which was filed on Jun. 6, 2014 in the name of Jamie D. Whaley and is entitled "Multi-Purpose Adjustable Retaining Device"; which is a continuation-in-part of U.S. patent application Ser. No. 13/176,806, which was filed on Jul. 6, 2011 in the name of Jamie D. Whaley and is entitled "Multi-Purpose Adjustable Retaining Device"; which claims priority from U.S. Patent No. 61/399,175, which was filed on Jul. 8, 2010 in the name of Jamie D. Whaley and is entitled "Multi-Purpose Adjustable Retaining Device"; all of which are hereby incorporated by reference for all purposes.

TECHNICAL FIELD OF THE INVENTION

This invention relates, in general, to the field of retaining articles in place and, more particularly, to the a multi-purpose retaining device for retaining materials such as bed sheets, tarps, table cloths, and similar articles in place.

BACKGROUND OF THE INVENTION

Without limiting the scope of the present disclosure, its background will be described with reference to bed coverings, as an example. Bed coverings and particularly sheets often slip due to loss of elastic, for example. Alternatively, thin, extremely smooth sheets, and flat sheets without an edge may also experience slipping. Sheets that have slipped may lead to discomfort while sleeping and present untidy or careless appearance. Accordingly, a need exists for improvements in the field of retaining articles, such as bed coverings, in place.

SUMMARY OF THE INVENTION

It would be advantageous to achieve advances in the field of retaining articles, such as bed coverings and sheets, which address slipping. It would also be desirable to enable a mechanical solution that would be easy and convenient to use for retaining all types of articles, while promoting a tidy and organized appearance. To better address one or more of these concerns, a multi-purpose retaining device is disclosed. In one embodiment, a cord having two ends is provided that is composed of an elastomeric material configured to deform elastically upon elongation. Each of the ends of the cord is threaded through a cord stop, which permits the length of each end to be adjusted, with any spare cord forming a loop extending from a side of the cord stop opposite the two ends. Suspension clips are respectively slidably connected to each end of the cord in order to grip a material. In one embodiment of a kit, the multi-purpose adjustable retaining device may be employed with a material, such as bed covering to provide a fitted sheet equivalent. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a front perspective view of one embodiment of a multi-purpose retaining device being employed to retain a portion of a bed sheet, as an example, according to the teachings presented herein;

FIG. 2A is a front perspective view of the multi-purpose retaining device depicted in FIG. 1 being adjusted by tightening;

FIG. 2B is a side perspective view of the multi-purpose retaining device depicted in FIG. 2A as viewed along line 2B-2B;

FIG. 4A is a front exploded view of the multi-purpose retaining device depicted in FIG. 1;

FIG. 4B is a front exploded view of one component of the multi-purpose retaining device depicted in FIG. 4B, wherein that one embodiment of the component, a cord, is depicted as elongated;

FIG. 5 is a bottom plan view depicting one embodiment of a component, a cord stop, of the multi-purpose retaining device;

FIG. 6A is a cross-sectional view depicting one embodiment of the cord stop in a first operational configuration;

FIG. 6B is a cross-sectional view of the cord stop in a second operational configuration; and FIG. 7 is a bottom plan view depicting one embodiment of a component, a suspension clip, of the multi-purpose retaining device.

DETAILED DESCRIPTION OF THE INVENTION

Figures 3A, 3B, 3C:
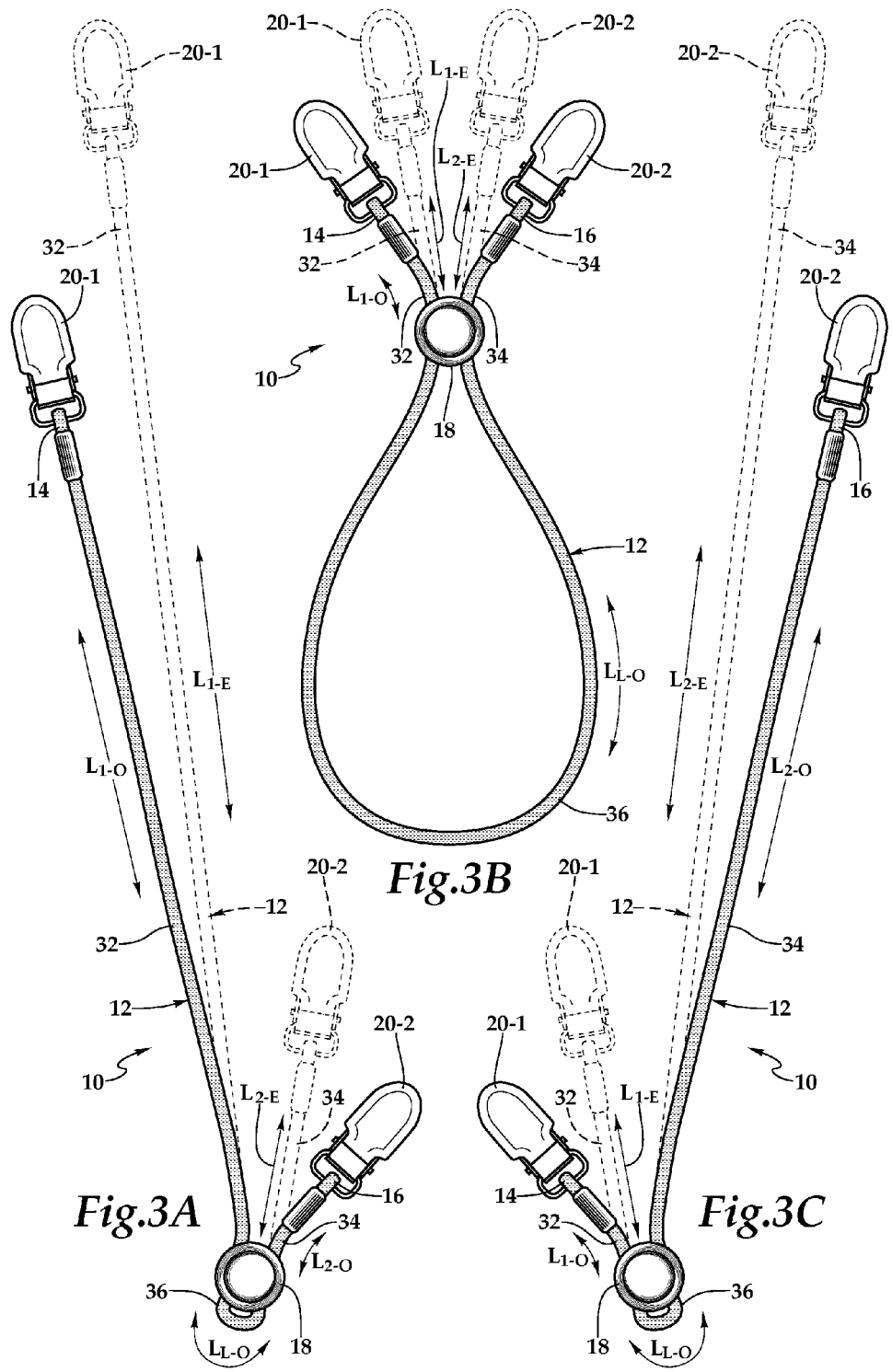
FIG. 3A is a top plan view of the multi-purpose retaining device depicted in FIG. 1 in a first operational configuration.
FIG. 3B is a top plan view of the multi-purpose retaining device depicted in FIG. 1 in a second operational configuration.
FIG. 3C is a top plan view of the multi-purpose retaining device depicted in FIG. 1 in a third operational configuration.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1, FIG. 2A, and FIG. 2B, therein is depicted one embodiment of a multi-purpose adjustable retaining device that is schematically illustrated and generally designated 10. As shown, the multi-purpose adjustable retaining device 10 includes a cord 12, which has two ends 14, 16, composed of an elastomeric material configured to deform elastically upon elongation. Each of ends 14, 16 of the cord 12 are threaded through a cord stop 18, which permits the length of the cord 12 to be adjusted, with any spare cord 12 forming a loop. Suspension clips 20-1, 20-2, which may be individually or collectively suspension clips 20, are respectively slidably connected to each end 14, 16 of the cord 10 in order to grip a material.

As depicted, the multi-purpose adjustable retaining device 10 is gripping a fitted bed sheet S, which over time and through use has lost its elastic edge E. In this manner, the multipurpose adjustable retaining device forms a portion of a kit providing a fitted sheet equivalent for a bed sheet having a non-elastic edge, for example. It should be appreciated that although the multi-purpose adjustable retaining device 10 is illustrated being utilized to retain a bed sheet under the desired tension, the multi-purpose adjustable retaining device may be employed to provide increased tension and/or fit to a variety of materials. By way of example and not by way of limitation, the multi-purpose adjustable retaining device may be employed with bed coverings, flat sheets, mattress pads, futons, RV beds, travel trailer beds, camper beds, air mattresses, grill covers, tablecloths, furniture covers, pet bedding covers, outdoor equipment covers, car seat covers, boat seat covers, and message tables, for example.

Referring now to FIG. 3A, FIG. 3B, FIG. 3C, FIG. 4A, and FIG. 4B, as discussed, the cord 12 includes ends 14, 16 and is composed of an elastomeric material 30 configured to deform elastically upon elongation. As shown, the elastomeric material 30 includes an original length $L_O$ and a length after elongation $L_E$, wherein $L_E$ is greater than $L_O$. In one implementation, the modulus of elasticity of the cord 12 is as follows, expressed by stretch:

STRETCH=80%

It should be appreciated, however, that the elasticity as expressed or represented by stretch of the cord 12 may be between about 65% and about 95%. Further, in one implementation, other characteristics of the cord 12 may include about ⅛" diameter cord (+/−0.050"), including about 30% (+/−4%) nylon yarn and about 70% (+/−4%) natural rubber with a machine size of about 16 CARR.

The cord stop 18 divides the cord 12 into a cord segment 32 proximate the end 14, a cord segment 34 proximate the end 16 and a loop segment 36. As shown, the initial length $L_{1-O}$ of the cord segment 32 is between about 0 (e.g., FIG. 3C) and about the original length $L_0$ (e.g., FIG. 3A) of the cord 12. Similarly, the initial length $L_{2-0}$ of the cord segment 34 is between about 0 (e.g., FIG. 3A) and about the original length $L_0$ (e.g., FIG. 3C). The loop length $L_{L-0}$ of the loop segment is between about 0 (e.g., FIG. 3A or FIG. 3C) and about the original length $L_0$ of the cord 12 (e.g., FIG. 3B). As shown, the sum of the initial length $L_{1-0}$ of the cord segment 32, the initial length $L_{2-0}$ of the cord segment 34, and the loop length $L_{L-0}$ is equal to the original length $L_O$ of the cord 12. Moreover, the lengths of the cord segments 32, 34 are mutually exclusive.

Continuing to refer to FIGS. 3A through 4B, each of the cord segments 32, 34 as well as the entire cord 12 has an elongated length. As shown, the cord 12 has an elongated length $L_E$. The cord segments 32, 34 have respective elongated lengths of $L_{1-E}$, and $L_{2-E}$. As shown by comparing FIGS. 3A, 3B, and 3C for comparative and illustrative purposes, the elongated lengths $L_{1-E}$, and $L_{2-E}$ depend on the elasticity, stretch, and the stain of the cord 12 as well as the lengths $L_{1-0}$ and $L_{2-0}$ of the respective cord segments 32, 34.

Referring now to FIG. 4A through FIG. 6B, the cord stop 18 includes a barrel 44 having a floor member 46 with a sidewall 48 extending therefrom. The floor member 46 includes an interior 50 and an exterior 52. An opening 54 is defined by the sidewall 48. A flange 56 circumscribes the sidewall 48 and extends inward therefrom into the opening 54. Two pairs of aligned openings 58, 60 and 62, 64 traverse the sidewall 48. A plunger 66 is spring-mounted to the interior 50 of the barrel 44 such that the plunger is biased against the floor member 46. As shown, in one embodiment, the plunger 66 includes two channels 68, 70 passing therethrough. A spring 72 is mounted, in an interposing manner, in between the interior 50 of the barrel 44 and the plunger 66. As shown by arrow 74, the spring 72 presses the plunger 66 toward the opening 54 and the flange 56, which restricts the movement of the plunger 66. As shown in FIG. 6A, the channels 68, 70 are aligned with the pairs of aligned openings 58, 60 and 62, 64 of the cord stop 18 when the spring-mounted plunger 66 is compressed. On the other hand, as shown in FIG. 6B by arrow 76, the channels 68, 70 are vertically offset from the pairs of aligned openings 58, 60 and 62, 64 of the cord stop 18 when the spring-mounted plunger 66 is relaxed. Further, as depicted in FIG. 4A through FIG. 6B, the ends 14, 16 of the cord 12 are threaded through the pairs of aligned openings 58, 60 and 62, 64 of the cord stop 18.

Referring now to FIG. 3A through FIG. 4A and FIG. 7, crimping loop sleeves 80, 82 are coupled to the respective ends 14, 16 of the cord 12 by being secured to respective end loops 84, 86 at the ends 14, 16. As shown, the suspension clips 20-1, 20-2, which in one embodiment, may be metal suspension clips, are respectively slidably secured to the end loops 84, 86 as shown by arrows 88, 90. Each of the suspension clips 20-1 and 20-2 includes a base member 100 having teeth 102. A slotted flange member 104 having a slot 106 extends from the base member 100. Further, a pair of opposing flange members 108 also extend from the base member 100. As illustrated, a gripping member 110 with teeth 112 is provided. In one embodiment, the teeth 110, 112 include plastic inserts configured to provide a plastic-to-plastic grip therebetween. The teeth 112 are configured to complement the teeth 102. A lever member 114 includes a pivot member 116 superposed on the gripper member 110. The lever member 114 is pivotally coupled by a pair of pivot pins 118 to the opposing side flange members 104 of the base member 100. Rotation of the lever member 114 around the pivot pins 118 as shown by arrow 120 provides a cam action, which tightly locks the gripping member 110 to the base member 100, thereby locking the teeth 102 and teeth 112 in engagement about a material.

With reference to FIGS. 1 through 7, in operation, the multi-purpose adjustable retaining device 10 provides a thumb-finger precision grip platform 130 and a handle area 132 for the two-handed selective adjustment of the multi-purpose adjustable retaining device 10. Initially, the suspension clips 20 are coupled to the material, which is depicted as a fitted bed sheet S that has lost the elasticity of elastic edge E. With respect to the thumb-finger precision grip platform 130, the exterior 52 of the floor member 46 of the barrel 44 of the cord stop 18 is sized to provide a finger platform component 134 of a thumb-finger precision grip platform 130. Cooperating therewith, as shown, the plunger 66 is sized to provide a thumb platform component 136 of the thumb-finger precision grip platform 130. In one embodiment, the thumb-finger precision grip platform 130 is configured to furnish a subtermino-lateral opposition key grip wherein the pad of the thumb presses against the side of the index finger to hold the cord stop therebetween. Alternatively, the thumb-finger precision grip platform 130 is configured to provide a subterminal opposition in which the palmar surfaces of the thumb and index finger to hold the cord stop therebetween.

With the individual engaging the thumb-finger precision grip platform with the thumb T and index finger F, the other hand H grasps the loop segment 36 of the cord 12 in preparation to adjust the length of the cord segments 32, 34 and loop segment 36, and the tension of the loop segments 32, 34. The plunger 66 is depressed by the index finger F, permitting the cord 12 to be selectively and adjustably engaged by the hand H until the desired length of loop segments 32, 34 and tension is realized. As previously discussed, each loop segment 34, 34 of the cord 12 may be of a different length or the same length, depending on the application.

With respect to the handle area 132 for the two-handed selective adjustment, a hand may manipulate the length and thereby, the tension, of the cord segments. That is, the thumb-finger precision grip platform 130 cooperates with the loop segment 36 at the handle area 132 to provide one-hand selective actuation of the multi-purpose adjustable retaining device 10 and, simultaneously, other-hand adjustment of the length of the cord segments 32, 34. As discussed, the cord segments are configured to deform elastically upon elongation responsive to the suspension clips being coupled to a material.

It should be appreciated that although particular cords, cord stops and suspension clips are depicted in the drawings, other types of cord stops and suspension clips are within the teachings presented herein. By way of example and not by way of limitation, the cord may be a bungee cord with a circular cross-section or generally any type of elastic band. Other materials that may be utilized include nylon, plastic, rubber, string, or any other material. The cord may be one or two cords of various lengths, diameters or measurements. As discussed, the cord may include some elasticity, but in some applications a fixed cord length may be desirable and, in those instances, a non-elastic cord may be used.

The cord stop may be a cord lock of the type defining at least one passage therethrough and adapted to releasably engage a cord by operation of a spring-loaded release button. Cord stops may be obtained in many configurations, some of which have a button-like appearance, and others which have a barrel shape. Similarly, cord stops may include multiple passages therethrough to receive two or more cords. By way of further example, the suspension clips may be a clamp, clasp, clip, hook or loop fastener, button, magnet, or pin, for example.

The order of execution or performance of the methodologies illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A multi-purpose adjustable retaining device in combination with a material comprising
    a cord having a first end and a second end, the cord being composed of an elastomeric material configured to deform elastically upon elongation, the elastomeric material having an original length $L_O$ and a length after elongation $L_E$, wherein $L_E$ is greater than $L_O$;
    the cord having an elasticity as expressed by stretch between about 65% and about 95%;
    a cord stop comprising:
        a barrel having a floor member with a sidewall extending therefrom, the floor member having an interior and an exterior, the exterior of the floor member sized to provide a finger platform component of a thumb-finger precision grip platform, the sidewall defining an opening in the barrel,
        a flange circumferentially inscribing the sidewall and extending inward therefrom into the opening,
        first and second pairs of aligned openings traversing the sidewall,
        a plunger spring-mounted to the interior of the base, the plunger being biased against the base, the plunger having first and second channels passing therethrough,
        a spring mounted to the interior of the base and plunger, the spring pressing the plunger toward the opening and the flange, which restricts the movement thereof,
        the plunger being sized to provide a thumb platform component of a thumb-finger precision grip platform,
        the first and second channels being aligned with the first and second pairs of aligned openings of the cord stop when the spring-mounted plunger is compressed, and
        the first and second channels being vertically offset from the first and second pairs of aligned openings of the cord stop when the spring-mounted plunger is relaxed;
    the first and second ends of the cord being threaded through the first and second pairs of aligned openings of the cord stop;
    the cord stop in combination with the first end of the cord defining a first cord segment having an initial length $L_{1-O}$, the cord stop in combination with the second end of the cord defining a second cord segment having an initial length $L_{2-O}$, the cord stop in combination with the cord defining a loop segment having an initial length LSI;
    the initial length $L_{1-O}$ of the first cord segment being between about 0 and about the original length L0, the initial length $L_{2-O}$ of the second cord segment being between about 0 and about the original length $L_O$, the loop length $L_{L-O}$ of the loop segment being between about 0 and about the original length $L_O$, the sum of the initial length $L_{1-O}$ of the first cord segment, the initial length $L_{2-O}$ of the second cord segment, and the loop length $L_{L-O}$ being equal to the original length $L_O$ of the cord;
    first and second crimping loop sleeves coupled to the respective first and second ends of the cord, the first and second crimping loop sleeves securing respective first and second end loops thereat;
    first and second suspension clips respectively secured to the first and second end loops, each of the first and second suspension clips comprising:
        a base member having first teeth extending therefrom, the base member having a slotted flange member extending therefrom defining a slot, the base member having a pair of opposing side flange members,
        a gripping member with second teeth configured to complement the first teeth, and
        a lever member including a pivot member superposed on the gripper member, the lever member being pivotally coupled by a pair of pivot pins to the opposing side flange members of the base member,
        wherein rotation of the lever member around the pivot pins providing a cam action which tightly locks the gripping member to the base member, thereby locking the first and second suspension clips;
    the first and second end loops slidably connected to the respective slots of the first and second suspension clips;
    the first and second cord segments configured to deform elastically upon elongation responsive to the first and second suspension clips being coupled to a material; and
    wherein the material is selected from the group consisting of bed coverings, flat sheets, fitted sheets, mattress pads, futons, RV beds, travel trailer beds, camper beds, air mattresses, grill covers, tablecloths, furniture covers, pet bedding covers, outdoor equipment covers, car seat covers, boat seat covers, and message tables.

2. The multi-purpose adjustable retaining device as recited in claim 1, wherein the elasticity expressed as stretch is about 80%.

3. The multi-purpose adjustable retaining device as recited in claim 1, wherein the cord further comprises a composition of about 30% nylon yarn and about 70% natural rubber.

4. The multi-purpose adjustable retaining device as recited in claim 1, further comprising the thumb-finger precision grip platform cooperating with the loop segment to provide one-hand selective actuation of the multi-purpose adjustable retaining device and, simultaneously, other-hand adjustment of the length of the first and second cord segments.

5. The multi-purpose adjustable retaining device as recited in claim 1, wherein each of the first and second teeth further comprise plastic inserts configured to provide a plastic-to-plastic grip.

6. A multi-purpose adjustable retaining device in combination with a material comprising
   a cord having a first end and a second end, the cord being composed of an elastomeric material configured to deform elastically upon elongation, the elastomeric material having an original length $L_O$ and a length after elongation $L_E$, wherein $L_E$ is greater than $L_O$;
   the cord having an elasticity as expressed by stretch of about 80%;
   the cord having a composition of about 30% nylon yarn and about 70% natural rubber;
   a cord stop comprising:
      a barrel having a floor member with a sidewall extending therefrom, the floor member having an interior and an exterior, the exterior of the floor member sized to provide a finger platform component of a thumb-finger precision grip platform, the sidewall defining an opening in the barrel,
      a flange circumferentially inscribing the sidewall and extending inward therefrom into the opening,
      first and second pairs of aligned openings traversing the sidewall,
      a plunger spring-mounted to the interior of the base, the plunger being biased against the base, the plunger having first and second channels passing therethrough,
      a spring mounted to the interior of the base and plunger, the spring pressing the plunger toward the opening and the flange, which restricts the movement thereof,
      the plunger being sized to provide a thumb platform component of a thumb-finger precision grip platform,
      the first and second channels being aligned with the first and second pairs of aligned openings of the cord stop when the spring-mounted plunger is compressed, and
      the first and second channels being vertically offset from the first and second pairs of aligned openings of the cord stop when the spring-mounted plunger is relaxed;
   the first and second ends of the cord being threaded through the first and second pairs of aligned openings of the cord stop;
   the cord stop in combination with the first end of the cord defining a first cord segment having an initial length $L_{1-O}$, the cord stop in combination with the second end of the cord defining a second cord segment having an initial length $L_{2-O}$, the cord stop in combination with the cord defining a loop segment having an initial length $L_{L-O}$;
   the initial length $L_{1-O}$ of the first cord segment being between about 0 and about the original length $L_O$, the initial length $L_{2-O}$ of the second cord segment being between about 0 and about the original length $L_O$, the loop length $L_{1-O}$ of the loop segment being between about 0 and about the original length $L_O$, the sum of the initial length $L_{1-0}$ of the first cord segment, the initial length $L_{2-O}$ of the second cord segment, and the loop length $L_{L-O}$ being equal to the original length $L_O$ of the cord;
   first and second crimping loop sleeves coupled to the respective first and second ends of the cord, the first and second crimping loop sleeves securing respective first and second end loops thereat;
   first and second suspension clips respectively secured to the first and second end loops, each of the first and second suspension clips comprising:
      base member having first teeth extending therefrom, the base member having a slotted flange member extending therefrom defining a slot, the base member having a pair of opposing side flange members,
      a gripping member with second teeth configured to complement the first teeth, and
      a lever member including a pivot member superposed on the gripper member, the lever member being pivotally coupled by a pair of pivot pins to the opposing side flange members of the base member,
      wherein rotation of the lever member around the pivot pins providing a cam action which tightly locks the gripping member to the base member, thereby locking the first and second suspension clips;
   the first and second end loops slidably connected to the respective slots of the first and second suspension clips;
   the first and second cord segments configured to deform elastically upon elongation responsive to the first and second suspension clips being coupled to a material;
   the thumb-finger precision grip platform cooperating with the loop segment to provide one-hand selective actuation of the multi-purpose adjustable retaining device and, simultaneously, other-hand adjustment of the length of the first and second cord segments; and
   wherein the material comprises a bed covering selected from the group consisting of flat sheets and fitted sheets.

7. A multi-purpose adjustable retaining device forming a fitted sheet equivalent comprising:
   a bed sheet having a non-elastic edge;
   a cord having a first end and a second end, the cord being composed of an elastomeric material configured to deform elastically upon elongation, the elastomeric material having an original length $L_O$ and a length after elongation $L_E$, wherein $L_E$ is greater than $L_O$;
   the cord having an elasticity as expressed by stretch of about 80%;
   the cord having a composition of about 30% nylon yarn and about 70% natural rubber;
   a cord stop comprising:
      a barrel having a floor member with a sidewall extending therefrom, the floor member having an interior and an exterior, the exterior of the floor member sized to provide a finger platform component of a thumb-finger precision grip platform, the sidewall defining an opening in the barrel,
      a flange circumferentially inscribing the sidewall and extending inward therefrom into the opening,
      first and second pairs of aligned openings traversing the sidewall, a plunger spring-mounted to the interior of the base, the plunger being biased against the base, the plunger having first and second channels passing therethrough, a spring mounted to the interior of the base and plunger, the spring pressing the plunger toward the opening and the flange, which restricts the movement thereof, the plunger being sized to provide a thumb platform component of a thumb-finger precision grip platform, the first and second channels being aligned with the first and second pairs of aligned openings of the cord stop when the spring-mounted plunger is compressed, and the first and second channels being vertically offset from the first and second pairs of aligned openings of the cord stop when the spring-mounted plunger is relaxed;

the first and second ends of the cord being threaded through the first and second pairs of aligned openings of the cord stop;

the cord stop in combination with the first end of the cord defining a first cord segment having an initial length $L_{1-O}$, the cord stop in combination with the second end of the cord defining a second cord segment having an initial length $L_{2-O}$, the cord stop in combination with the cord defining a loop segment having an initial length $L_{L-O}$;

the initial length $L_{1-O}$ of the first cord segment being between about 0 and about the original length $L_O$, the initial length $L_{2-O}$ of the second cord segment being between about 0 and about the original length $L_O$, the loop length $L_{L-O}$ of the loop segment being between about 0 and about the original length $L_O$, the sum of the initial length $L_{1-O}$ of the first cord segment, the initial length $L_{2-O}$ of the second cord segment, and the loop length $L_{L-O}$ being equal to the original length $L_O$ of the cord;

first and second crimping loop sleeves coupled to the respective first and second ends of the cord, the first and second crimping loop sleeves securing respective first and second end loops thereat;

first and second suspension clips respectively secured to the first and second end loops, each of the first and second suspension clips comprising:

base member having first teeth extending therefrom, the base member having a slotted flange member extending therefrom defining a slot, the base member having a pair of opposing side flange members, a gripping member with second teeth configured to complement the first teeth, and a lever member including a pivot member superposed on the gripper member, the lever member being pivotally coupled by a pair of pivot pins to the opposing side flange members of the base member, wherein rotation of the lever member around the pivot pins providing a cam action which tightly locks the gripping member to the base member, thereby locking the first and second suspension clips to the bed sheet;

the first and second end loops slidably connected to the respective slots of the first and second suspension clips;

each of the first and second suspension clips being secured to the bed sheet;

the first and second cord segments configured to deform elastically upon elongation responsive to the first and second suspension clips being coupled to the bed sheet; and the thumb-finger precision grip platform cooperating with the loop segment to provide one-hand selective actuation of the multi-purpose adjustable retaining device and, simultaneously, other-hand adjustment of the length of the first and second cord segments.

* * * * *